United States Patent
Chen (10) Patent No.: US 7,420,824 B2
(45) Date of Patent: Sep. 2, 2008

(54) METHOD OF DESIGNING AN RPWM INVERTER WITH UNWANTED HARMONIC ELIMINATION

(75) Inventor: Jyh-Wei Chen, Taipei (TW)

(73) Assignee: Tatung Company, Taipei (TW)

( * ) Notice: Subject to any disclaimer, the term of this patent is extended or adjusted under 35 U.S.C. 154(b) by 242 days.

(21) Appl. No.: 11/487,375

(22) Filed: Jul. 17, 2006

(65) Prior Publication Data

US 2007/0242489 A1    Oct. 18, 2007

(30) Foreign Application Priority Data

Apr. 13, 2006  (TW) .............................. 95113130 A (51) Int. Cl.
*H02M 1/12* (2006.01)
(52) U.S. Cl. .............................. 363/41; 363/39; 363/40; 375/238
(58) Field of Classification Search .................. 363/39, 363/40, 41; 375/238, 239, 253
See application file for complete search history.

(56) References Cited

U.S. PATENT DOCUMENTS 6,600,669 B2 *  7/2003  Trzynadlowski et al. ...... 363/41
2003/0117815 A1 *  6/2003  Saada .......................... 363/40

OTHER PUBLICATIONS

Jyh-Wei Chen; "Design of Random Pulse-Width Modulated Inverter with Lower-order Harmonic Elimination"; Nov. 6-10, 2005; Industrial Electronics Society, 2005. IECON 2005, 31st Annual Conference of IEEE; pp. 1088-1092.*

* cited by examiner

*Primary Examiner*—Jessica Han
*Assistant Examiner*—Emily Pham
(74) *Attorney, Agent, or Firm*—Bacon & Thomas, PLLC.

(57) ABSTRACT

A method of designing a random pulse width modulation (RPWM) inverter with unwanted harmonic elimination, which first uses a Fourier analysis and a numerical analysis to eliminate the unwanted harmonic components, next uses the equal area approach to produce switching angles to be used as start values for solving non-linear equations, next selects low-order harmonics to be eliminated and randomly sampled harmonics to solve the equations and obtain pluralities of switching angles for eliminating different harmonics, next applies pluralities of harmonics to a random probability function to thereby obtain a harmonic distribution, and finally uses a random sampling to evenly disperse the higher side-band harmonic components and effectively suppress the low-order harmonic components.

12 Claims, 7 Drawing Sheets

METHOD OF DESIGNING AN RPWM INVERTER WITH UNWANTED HARMONIC ELIMINATION

BACKGROUND OF THE INVENTION

1. Field of the Invention

The invention relates to a technical field of pulse width modulation and, more particularly, to a method of designing a random pulse width modulation (RPWM) inverter with unwanted harmonic elimination.

2. Description of Related Art

When the RPWM technique is applied to an inverter, the harmonics of an output voltage of the inverter are suppressed. In addition, the suppressed harmonics of the output voltage are expansively distributed over the entire spectrum. Therefore, the RPWM technique, unlike the sinusoidal pulse width modulation (SPWM) technique that produces special high harmonics nearby a multiple of switching frequencies, does not collect the harmonic energy at certain frequencies and can be used to drive a motor or generate AC sources, thereby improving the problems caused by the harmonics on running the motor or generating AC sources.

The features of a PWM inverter are determined by the output waveform. Programmed PWM inverters can have the optimal output waveforms and cancels the unwanted harmonics upon the objective functions or cost functions for various applications. The programmed PWM inverters have the advantages of reducing the torque vibration of an AC motor, the current ripples and the losses, and canceling the unwanted harmonics. However, for such inverters, solving the non-linear equations to obtain the output waveforms is required.

The programmed PWM inverters typically reduce more low-order harmonics. However, such a way produces great harmonic components nearby the side bands, and the harmonic components can cause electromagnetic interferences (EMIs) and acoustic noise. In addition, the switching frequencies of such inverters are increased with the increased number of reduced low-order harmonics, and thus the switching losses are increased. Moreover, even the noises are reduced, the output waveforms not produced by an RPWM are fixed, which can produce the specific-frequency, periodic noises as well.

SUMMARY OF THE INVENTION

The invention is to provide a method of designing a random pulse width modulation (RPWM) inverter with unwanted harmonics elimination, where the RPWM inverter has an RPWM waveform with M (a positive integer) trigger angles $(\alpha_1, \alpha_2, \ldots, \alpha_M)$ and the M trigger angles respectively indicate start and termination angles of the RPWM waveform. The method includes: (A) selecting an amplitude modulation index $M_a$ and a frequency modulation index $M_f$, where the amplitude modulation index $M_a$ is a ratio of a baseband amplitude to a DC link voltage of the RPWM waveform and the frequency modulation index $M_f$ is a ratio of a switching frequency of the RPWM waveform to the fundamental frequency; (B) computing start values for the M trigger angles based on an equal area approach; (C) selecting both low-order harmonics to be eliminated and randomly produced harmonics, and producing M non-linear equations; (D) transforming the M non-linear equations into M linear equations; (E) using a numerical iteration to compute the M trigger angles based on the start values.

Accordingly, the invention can improve the noises produced by the PWM switching frequencies, distribute the high frequency harmonic components of the inverter over the entire spectrum, completely suppress the low-order harmonic components, and disperse the EMI density.

Other objects, advantages, and novel features of the invention will become more apparent from the following detailed description when taken in conjunction with the accompanying drawings.

DETAILED DESCRIPTION OF THE PREFERRED EMBODIMENT

A method of designing a random pulse width modulation (RPWM) inverter with unwanted harmonic elimination, which first uses a Fourier analysis and a numerical analysis to eliminate the unwanted harmonic components, next uses the equal area approach to produce switching angles to be used as start values for solving non-linear equations, next selects low-order harmonics to be eliminated and randomly sampled harmonics to solve the equations and obtain pluralities of switching angles for eliminating different harmonics, next applies pluralities of harmonics to a random probability function to thereby obtain a harmonic distribution, and finally uses a random sampling to evenly disperse the higher side-band harmonic components and effectively suppress the low-order harmonic components.

Figure 1:
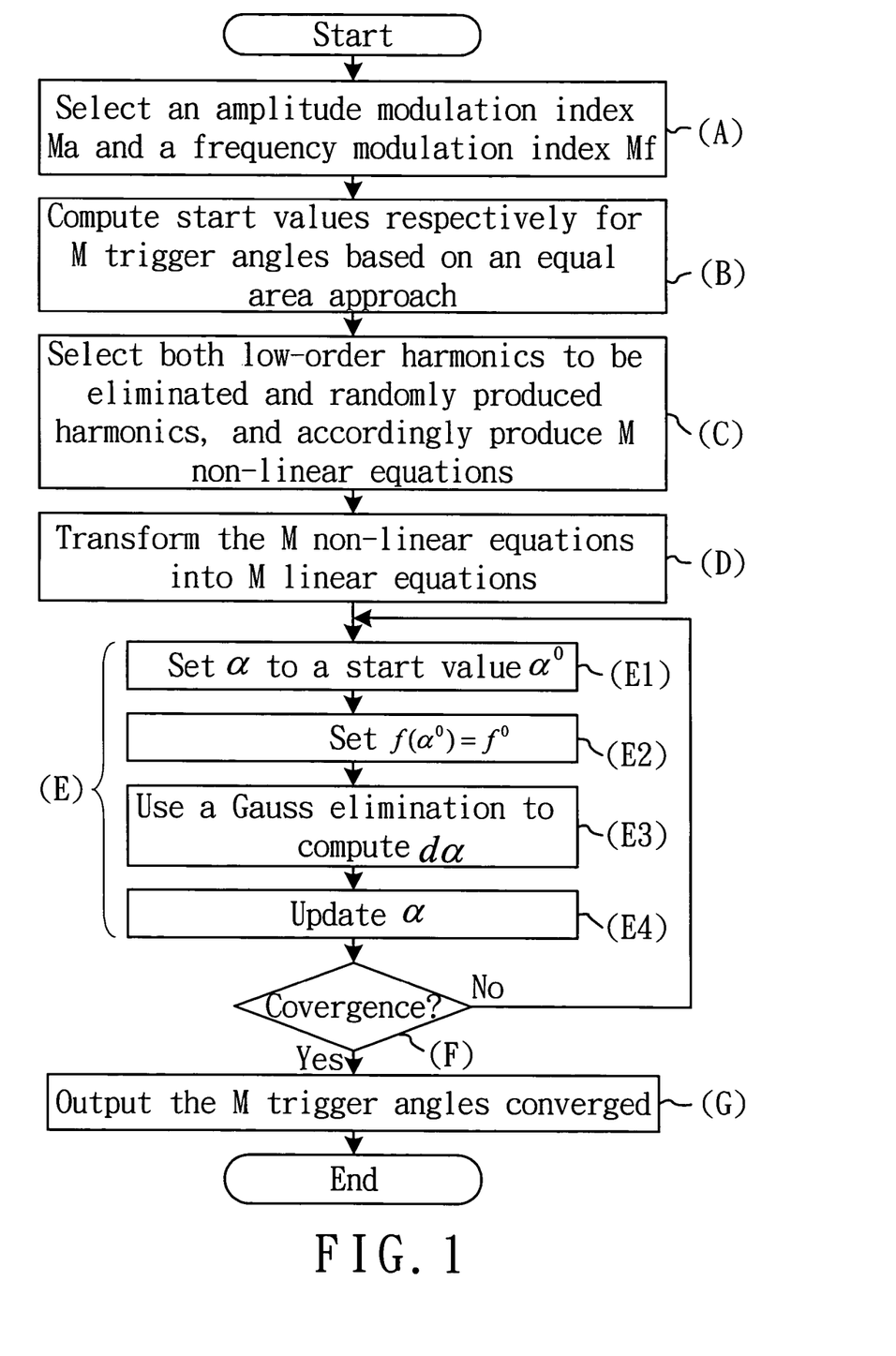
FIG. 1 is a flowchart of a method of designing a random pulse width modulation (RPWM) inverter with unwanted harmonics elimination.
Figure 2:
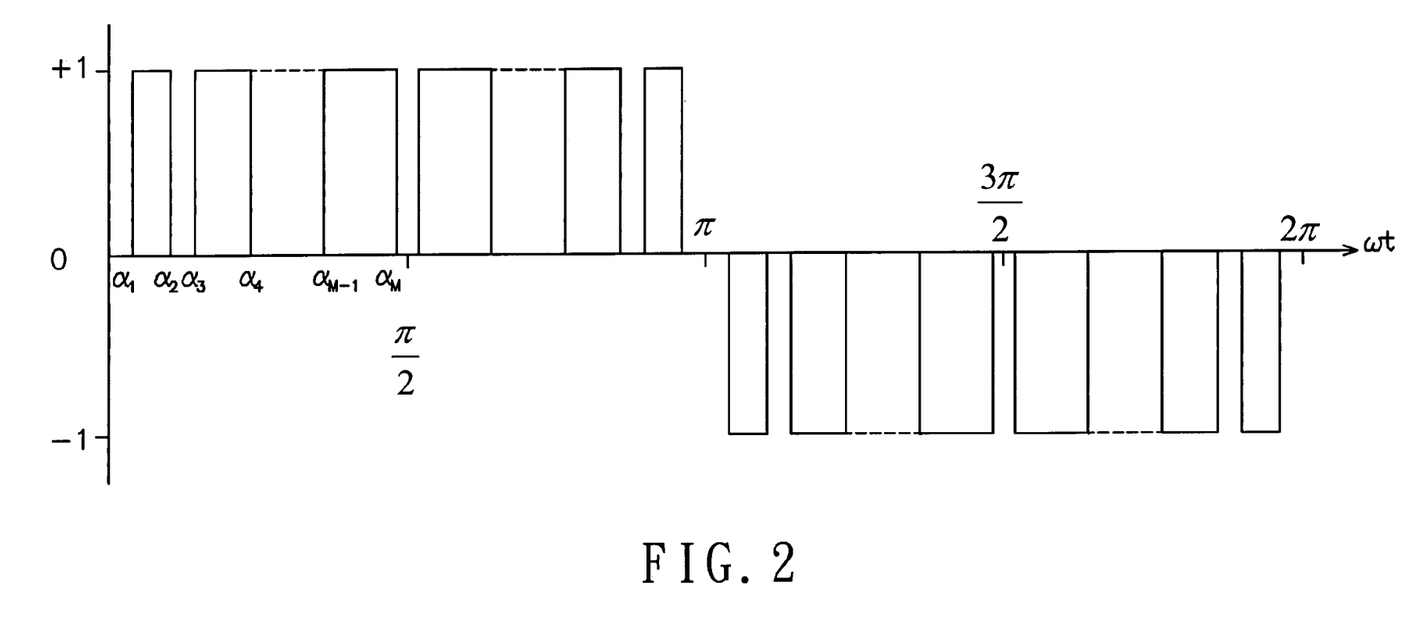
FIG. 2 is a graph of an output waveform of an RPWM inverter with unwanted harmonic elimination according to the invention.

FIG. 1 is a flowchart of a method of designing a random pulse width modulation (RPWM) inverter with unwanted harmonic elimination. FIG. 2 is a graph of an RPWM waveform according to the invention, which has M (a positive integer) trigger angles $(\alpha_1, \alpha_2, \ldots, \alpha_M)$ and the M trigger angles respectively indicate start and termination angles of the RPWM waveform.

As shown in FIG. 2, the RPWM waveform is quarter-symmetrical. The RPWM waveform can be represented by the following equations after a Fourier analysis is applied.

for $$f(\omega t) = \sum_{n=1}^{\infty} [a_n \sin(n\omega t)], \quad (1)$$

$$a_n = \frac{4}{n\pi} \sum_{k=1}^{N} (-1)^{k+1} \cos(n\alpha_k), \quad (2)$$

$$0 < \alpha_1 < \alpha_2 < \ldots < \alpha_M < \frac{\pi}{2}. \quad (3)$$

and

Since the waveform is a one-fourth periodic symmetry, there are only odd harmonic components.

As shown in FIG. 1, in the method, step (A) selects an amplitude modulation index $M_a$ and a frequency modulation index $M_f$. The amplitude modulation index $M_a$ is a ratio of a baseband amplitude to a DC value of the RPWM waveform, and the frequency modulation index $M_f$ is a ratio of a switching frequency of the RPWM waveform to the baseband frequency.

Step (B) computes start values for the M trigger angles based on an equal area approach. The equal area approach changes a sampled sinusoidal area into an area defined by corresponding RPWM pulse width to accordingly compute the start values for the M trigger angles.

Figure 3:
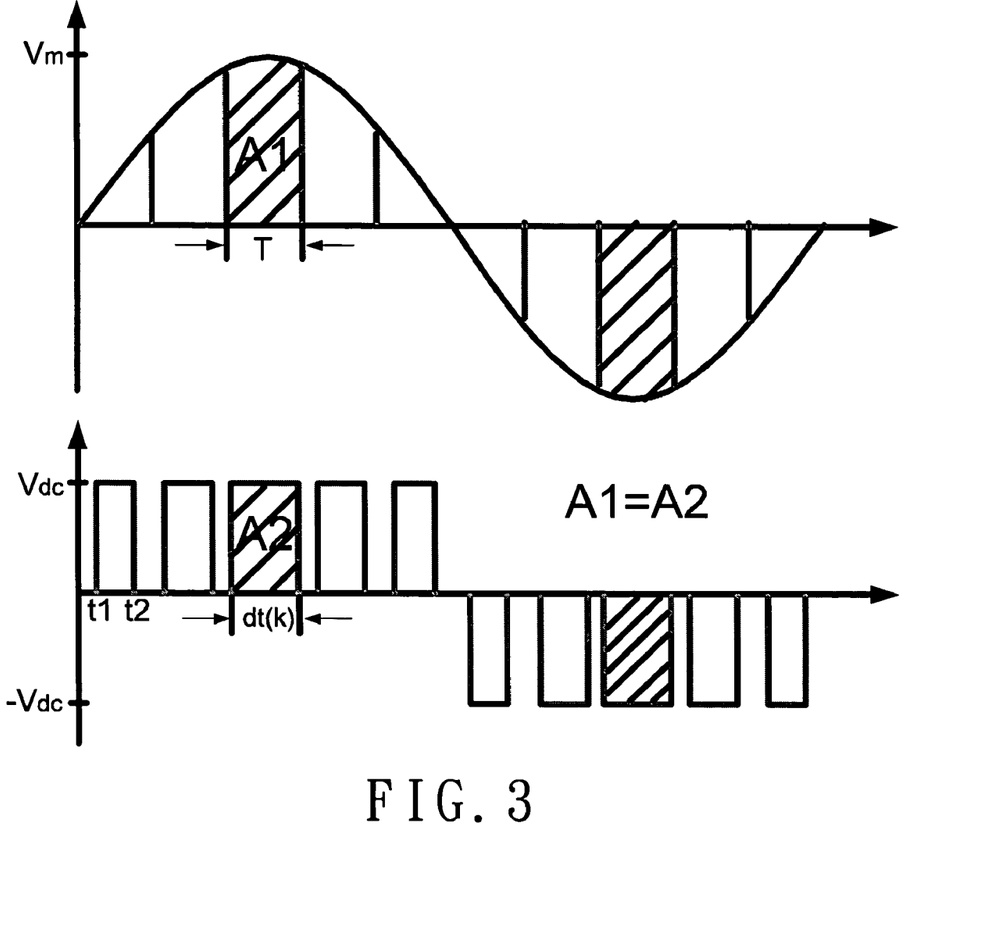
FIG. 3 is a graph of an equal area approach according to the invention.

FIG. 3 is a graph of the equal area approach according to the invention. An expected output voltage can be represented by the following equation.

$$v_0 = V_m \sin(\omega t) \quad (4).$$

If the sine wave is divided into N parts and the sinusoidal areas of each sampling period equal to corresponding output square areas, the switch-on time can be given by the following equation.

$$dt(k) = \frac{v_m}{\omega \times V_{dc}}[\cos(\omega t_k) - \cos(\omega t_{k+1})]. \quad (5)$$

where $t_k$ indicates a $k^{th}$ sampling time, $V_{dc}$ indicates an input DC voltage, $\omega$ indicates a sampling frequency, and $dt(k)$ indicates a $k^{th}$ sampled pulse width of the RPWM. In this case, the trigger angles $\alpha_{2k+1}$ and $\alpha_{2k+2}$ can be derived from the following equations respectively.

$$\alpha_{2k+1} = (k+0.5)T - dt(k)/2, \quad (6)$$

$$\alpha_{2k+2} = (k+0.5)T + dt(k)/2, \quad (7)$$

where T indicates a sampling period.

Step (C) selects both low-order harmonics to be eliminated and randomly produced harmonics and produces M non-linear equations. The M non-linear equations are produced from equation (2) containing the M variables $\alpha_1, \ldots, \alpha_M$, where the (M−1) non-linear equations are set to zero in order to eliminate corresponding (M−1) harmonics and the fundamental amplitude is determined by the amplitude modulation index $M_a$. Accordingly, an equation set (8) is given in the following to show the selection in step (C).

$$f_1(\alpha) = \frac{4}{\pi}\sum_{k=1}^{M}(-1)^{k+1}\cos(\alpha_k) = M_a, \quad (8)$$

$$f_2(\alpha) = \frac{4}{\delta n_2\pi}\sum_{k=1}^{M}(-1)^{k+1}\cos(n_2\alpha_k) = 0,$$

$$\vdots$$

$$f_M(\alpha) = \frac{4}{n_M\pi}\sum_{k=1}^{M}(-1)^{k+1}\cos(n_M\alpha_k) = 0,$$

where $M_a$ indicates the amplitude modulation index, $n_2, n_3, \ldots, n_M$ indicate the harmonics to be eliminated, and $f_1(\alpha), f_2(\alpha), \ldots, f_M(\alpha)$ indicate the produced M non-linear equations.

Step (D) transforms the M non-linear equations into M linear equations. The transformation in step (D) performs a one-order Taylor expansion on the M non-linear equations $f_1(\alpha), f_2(\alpha), \ldots, f_M(\alpha)$, which can be expressed by the following equation.

$$f^0 + \left[\frac{\partial f}{\partial \alpha}\right]^0 d\alpha = 0, \quad (9)$$

where $$\left[\frac{\partial f}{\partial \alpha}\right]^0$$

indicates a Jacobian matrix, $$\left[\frac{\partial f}{\partial \alpha}\right]^0 = \begin{bmatrix} \frac{\partial f_1}{\partial \alpha_1} & \frac{\partial f_1}{\partial \alpha_2} & \cdots & \frac{\partial f_1}{\partial \alpha_M} \\ \frac{\partial f_2}{\partial \alpha_1} & \frac{\partial f_2}{\partial \alpha_2} & \cdots & \frac{\partial f_2}{\partial \alpha_M} \\ \vdots & \vdots & & \vdots \\ \frac{\partial f_M}{\partial \alpha_1} & \frac{\partial f_M}{\partial \alpha_2} & \cdots & \frac{\partial f_M}{\partial \alpha_M} \end{bmatrix}. \quad (10)$$

Step (E) uses a numerical iteration to compute the M trigger angles based on the start values. Step (E) can be divided into steps (E1) to (E4), which are described in detail as follows.

Step (E1) sets the start value $\alpha^0$ for $\alpha$, where $$\alpha = [\alpha_1, \alpha_2, \ldots, \alpha_M]^T, \quad (11)$$

$$\alpha^0 = [\alpha_1^0, \alpha_2^0, \ldots, \alpha_M^0]^T. \quad (12)$$

the trigger angles obtained in equations (6) and (7) are used as the start values and taken in equation (12) for a numerical analysis.

Step (E2) sets $f(\alpha^0) = f^0$, for $f = [f_1, f_2, \ldots, f_M]^T$.

Step (E3) uses a Gauss elimination to compute $d\alpha$, where equation (9) is re-written into:

$$\left[\frac{\partial f}{\partial \alpha}\right]^0 d\alpha = -f^0, \quad (13)$$

Step (E4) updates $\alpha$ such that $\alpha^1 = \alpha^0 + \lambda d\alpha$, where $\alpha^1$ indicates an updated $\alpha$, and $\lambda$ indicates a weight, for $0 \leq \lambda \leq 1$.

Step (F) repeats steps (E1) to (E4) until a convergence occurs and M converged trigger angles are produced. Step (G)

outputs the M converged trigger angles to thereby produce the RPWM waveform with unwanted harmonic elimination.

In this embodiment, the low-order harmonic components are eliminated, and the random PWM samples are obtained. The method assigns partial degrees of freedom to the low-order harmonic components and uses a random sampling to assign the remainder. For an example of $M_f=46$, there are 23 degrees of freedom: ten to the low-order harmonics 3, 5, 7, ..., 21 to be eliminated, one to the base frequency (i.e., the amplitude modulation index $M_a$), and twelve to twelve ones randomly selected from the harmonics 23, 25, 27, ... 59 (totally, eighteen).

Figure 4:
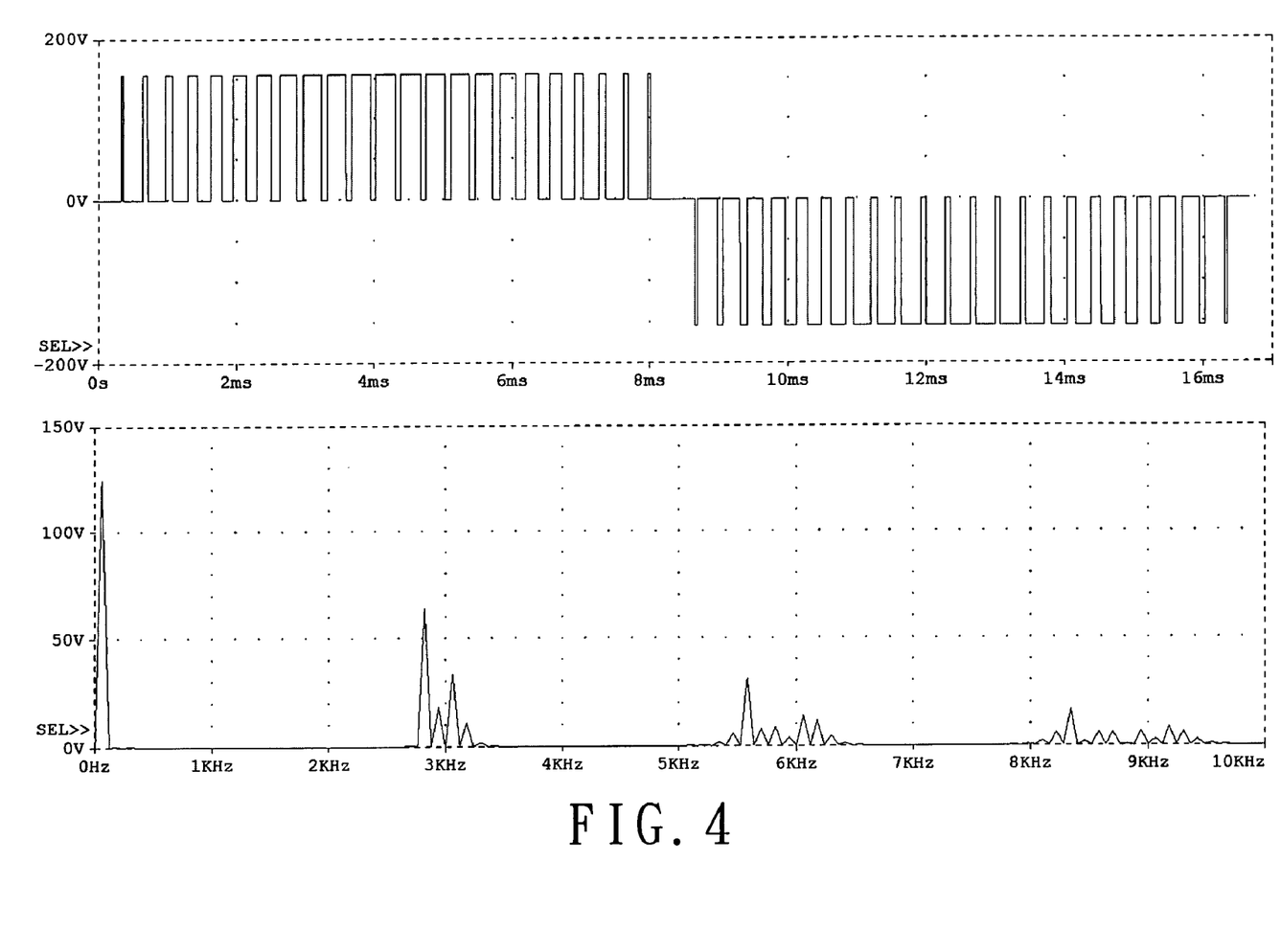
FIG. 4 is a graph of a waveform of an output voltage of a typical inverter with a programmed harmonic elimination.

FIG. 4 is a graph of a waveform of an output voltage of a typical inverter with a programmed harmonic elimination, which eliminates the low-order harmonics (23 degrees of freedom, i.e., 3, 5, ..., 47). As shown in FIG. 4, the PWM waveform has great harmonic components at side bands as the frequency modulation index $M_f=46$ and the amplitude modulation index $M_a=0.8$.

Figure 5:
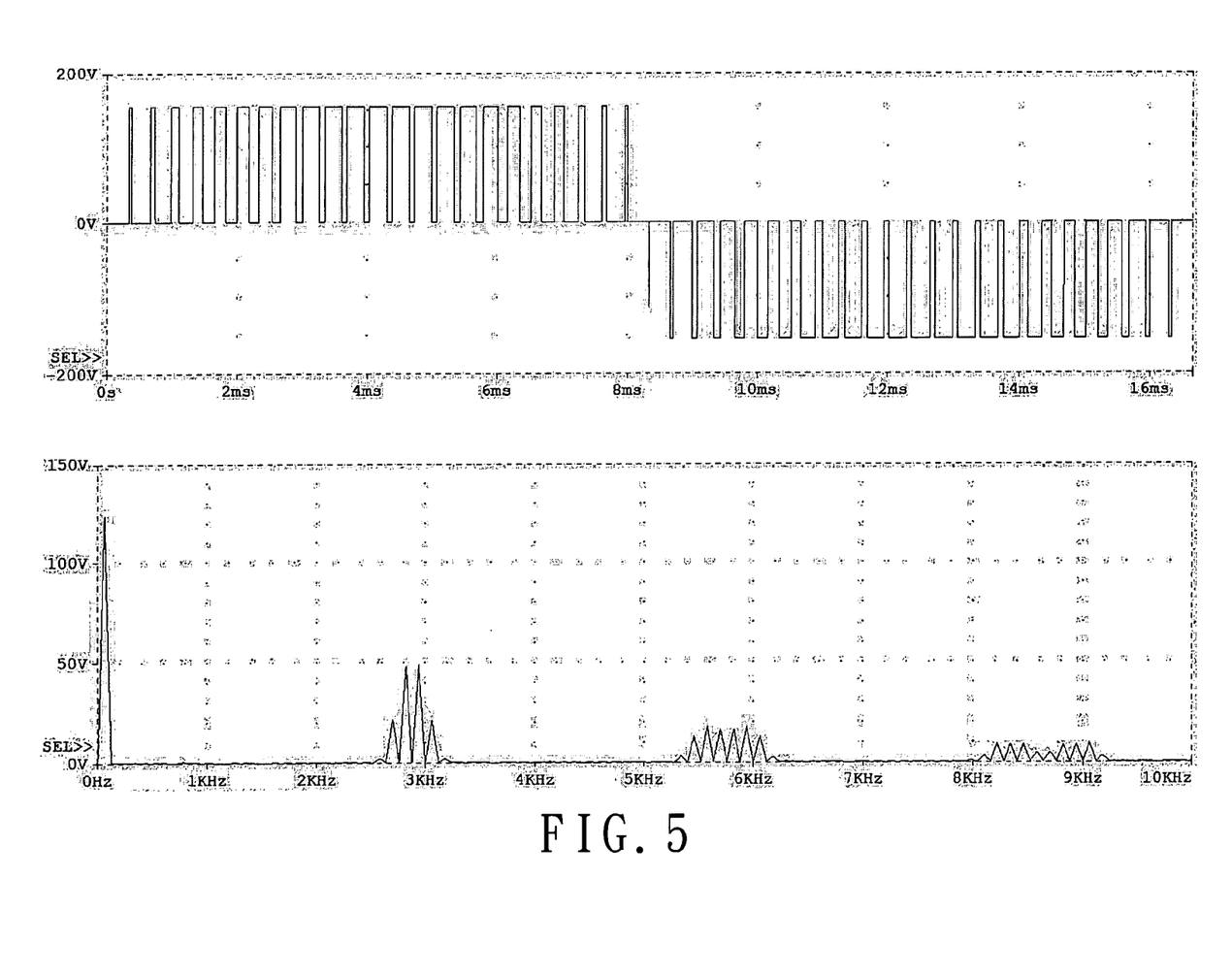
FIG. 5 is a graph of a waveform and spectrum of an output voltage of a SPWM emulation.

FIG. 5 is a graph of a waveform and spectrum of an output voltage of a SPWM emulation, which is performed by the PSPICE emulator for $M_a=0.8$ and $M_f=46$. By comparing the voltage waveforms of FIGS. 4 and 5, it is known that the typical SPWM presents the amplitude at the side bands (i.e., 45 harmonics, or 45*60=2700 Hz) higher than the typical programmed harmonic elimination (i.e., 47 harmonics, or 47*60=2820 Hz).

Figure 6:
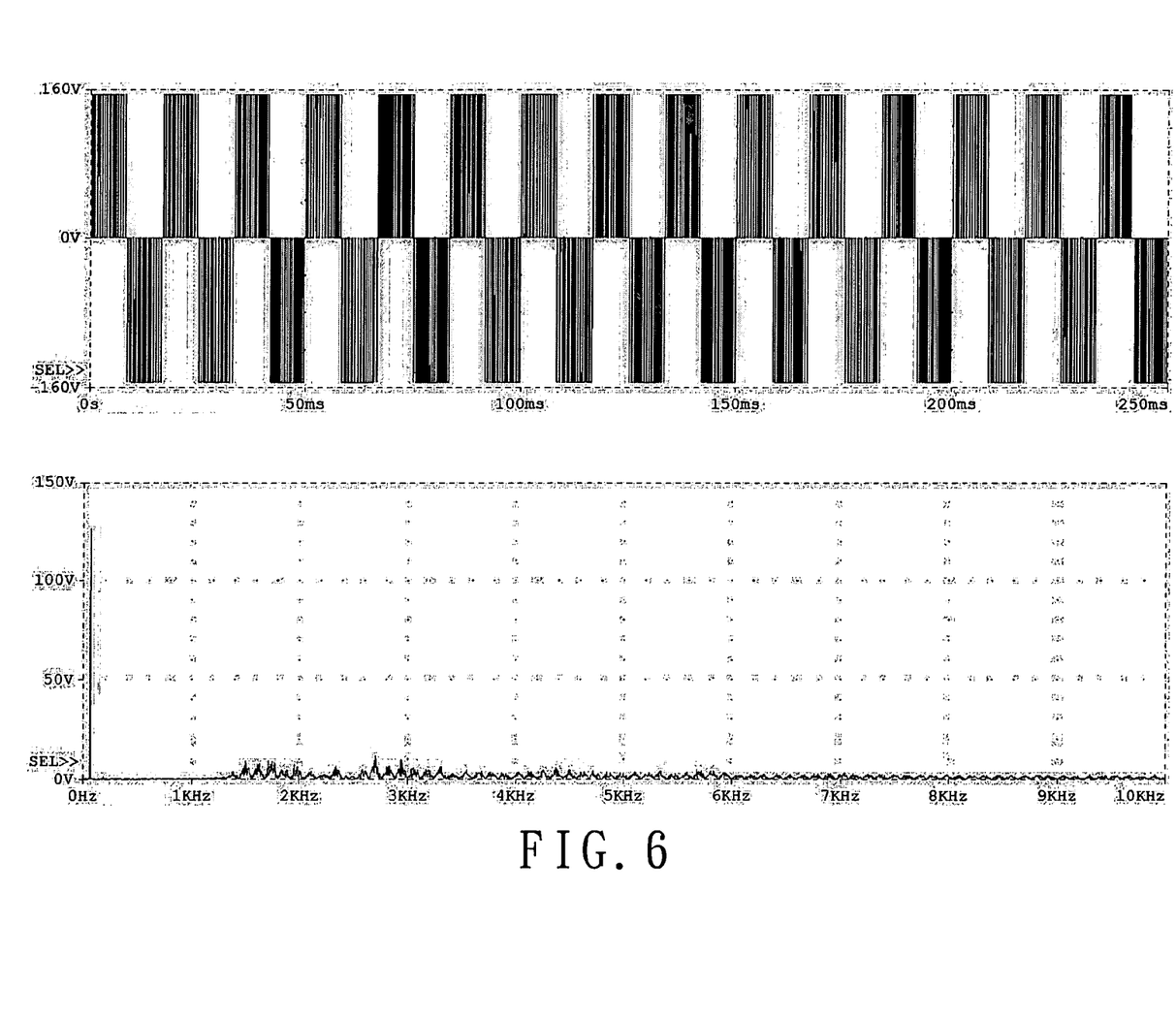
FIG. 6 is a graph of a waveform and spectrum emulation of an output voltage of an RPWM inverter with unwanted harmonic elimination according to the invention.

FIG. 6 is a graph of a waveform and spectrum emulation of an output voltage of an RPWM inverter with unwanted harmonic elimination according to the invention. The waveform and spectrum emulation is performed as the amplitude modulation index $M_a=0.8$, ten degrees of freedom are selected to fixedly eliminate the low-order harmonics 3, 5, 7, ..., 21, and the remaining twelve degrees of freedom are obtained by randomly sampling the harmonics 23, 25, 27, ..., 59 (totally, eighteen). Thus, the respective eighteen voltage waveforms are derived from the eighteen non-linear equations, where the base amplitude is $M_a=0.8$ and the harmonics 3, 5, 7, ..., 21 are eliminated. As shown in FIG. 6, the low-order harmonic components are suppressed completely, and the high-order harmonic components are dispersed evenly.

Figure 7:
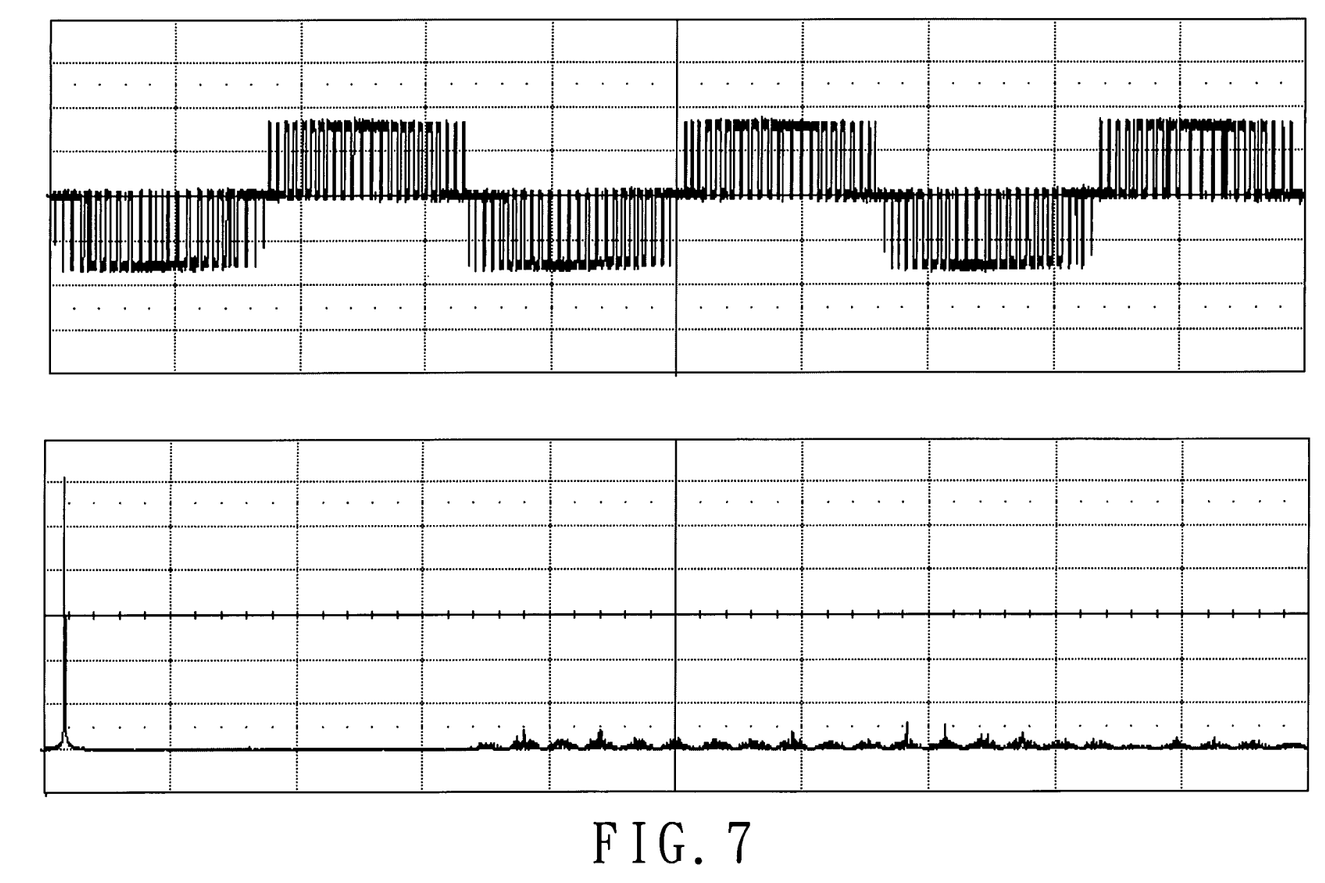
FIG. 7 is a graph of an output voltage and spectrum of an RPWM inverter with unwanted harmonic elimination according to the invention.

FIG. 7 is a graph of an output voltage and spectrum of an RPWM inverter with unwanted harmonic elimination according to the invention, which is obtained from a practical measure by an oscilloscope and a spectrum analyzer. As shown the waveform obtained by the practical measure in FIG. 7, it is known that the invention can effectively suppress the higher harmonic components at side bands and evenly disperse the remaining harmonic components, which effectively overcomes the problem occurred in the typical PWMs.

As cited, the invention provides a novel RPWM designed by improving the programmed harmonic elimination and analyzes the basic features of an output waveform of the novel RPWM. Common PWM switching frequencies are around the high-frequency range close to an audio, which produces the high-frequency noises with a power conversion to make people uncomfortable. Accordingly, the improved RPWM can overcome the cited problem, as the high-order harmonic components of the inverter implemented with the improved RPWM are dispersed evenly over the entire spectrum and the low-order harmonic components are eliminated completely. In addition, the EMI density can also be dispersed.

Although the present invention has been explained in relation to its preferred embodiment, it is to be understood that many other possible modifications and variations can be made without departing from the spirit and scope of the invention as hereinafter claimed.

What is claimed is:

1. A method of designing a random pulse width modulation (RPWM) inverter with unwanted harmonic elimination, where the RPWM inverter has an RPWM waveform with M (a positive integer) trigger angles ($\alpha_1, \alpha_2, ..., \alpha_M$) and the M trigger angles respectively indicate start and termination angles of the RPWM waveform, the method comprising the steps:

(A) selecting an amplitude modulation index $M_a$ and a frequency modulation index $M_f$, for the amplitude modulation index $M_a$ is a ratio of a baseband amplitude to a DC value of the RPWM waveform and the frequency modulation index $M_f$ is a ratio of a switching frequency of the RPWM waveform to the baseband frequency;

(B) computing start values for the M trigger angles based on an equal area approach;

(C) selecting both low-order harmonics to be eliminated and randomly produced harmonics and producing M non-linear equations;

(D) transforming the M non-linear equations into M linear equations; and (E) using a numerical iteration to compute the M trigger angles based on the start values.

2. The method as claimed in claim 1, further comprising the step: (F) repeating step (E) until a convergence occurs to accordingly produce the M trigger angles converged.

3. The method as claimed in claim 2, further comprising the step: (G) outputting the M trigger angles converged for producing the RPWM waveform with the unwanted harmonic elimination.

4. The method as claimed in claim 3, wherein the RPWM waveform is quarter-symmetrical.

5. The method as claimed in claim 4, wherein the RPWM waveform is given:

$$f(\omega t) = \sum_{n=1}^{\infty} [a_n \sin(n\omega t)],$$

for $$a_n = \frac{4}{n\pi} \sum_{k=1}^{N} (-1)^{k+1} \cos(n\alpha_k)$$

and $$0 < \alpha_1 < \alpha_2 < ... < \alpha_M < \frac{\pi}{2}.$$

6. The method as claimed in claim 5, wherein the equal area approach in step (B) changes a sampled sinusoidal area into an area defined by corresponding RPWM pulse width to accordingly compute the start values for the M trigger angles.

7. The method as claimed in claim 6, wherein the start values $\alpha_{2k+1}$ and $\alpha_{2k+2}$ for the M trigger angles are given:

$$\alpha_{2k+1}=(k+0.5)T-dt(k)/2,$$

$$\alpha_{2k+2}=(k+0.5)T+dt(k)/2,$$

where T indicates a sampling period and dt(k) indicates a $k^{th}$ sampled pulse width of the RPWM and is given:

$$dt(k) = \frac{v_m}{\omega \times V_{dc}}[\cos(\omega t_k) - \cos(\omega t_{k+1})],$$

where $t_k$ indicates a $k^{th}$ sampling time, $V_{dc}$ indicates an input DC voltage, $\omega$ indicates a sampling frequency, and an expected output voltage $V_0 = v_m \sin(\omega t)$.

8. The method as claimed in claim 7, wherein the selection in step (C) is shown:

$$f_1(\alpha) = \frac{4}{\pi} \sum_{k=1}^{M} (-1)^{k+1} \cos(\alpha_k) = M_a,$$

$$f_2(\alpha) = \frac{4}{n_2 \pi} \sum_{k=1}^{M} (-1)^{k+1} \cos(n_2 \alpha_k) = 0,$$

$$\vdots$$

$$f_M(\alpha) = \frac{4}{n_M \pi} \sum_{k=1}^{M} (-1)^{k+1} \cos(n_M \alpha_k) = 0,$$

where $M_a$ indicates the amplitude modulation index, $n_2, n_3, \ldots, n_M$ indicate the harmonics to be eliminated, and $f_1(\alpha), f_2(\alpha), \ldots, f_M(\alpha)$ indicate the M non-linear equations produced.

9. The method as claimed in claim 1, wherein the transform in step (D) performs a one-order Taylor expansion on the M non-linear equations $f_1(\alpha), f_2(\alpha), \ldots, f_M(\alpha)$.

10. The method as claimed in claim 9, wherein the one-order Taylor expansion is shown:

$$f^0 + \left[\frac{\partial f}{\partial \alpha}\right]^0 d\alpha = 0,$$

where $$\left[\frac{\partial f}{\partial \alpha}\right]^0$$

indicates a Jacobian matrix, $$\left[\frac{\partial f}{\partial \alpha}\right]^0 = \begin{bmatrix} \frac{\partial f_1}{\partial \alpha_1} & \frac{\partial f_1}{\partial \alpha_2} & \cdots & \frac{\partial f_1}{\partial \alpha_M} \\ \frac{\partial f_2}{\partial \alpha_1} & \frac{\partial f_2}{\partial \alpha_2} & \cdots & \frac{\partial f_2}{\partial \alpha_M} \\ \vdots & \vdots & & \\ \frac{\partial f_M}{\partial \alpha_1} & \frac{\partial f_M}{\partial \alpha_2} & \cdots & \frac{\partial f_M}{\partial \alpha_M} \end{bmatrix}.$$

11. The method as claimed in claim 10, wherein step (E) further comprises the steps:

(E1) setting the start value $\alpha^0$ for $\alpha$, where $\alpha = [\alpha_1, \alpha_2, \ldots, \alpha_M]^T$ and $\alpha^0 = [\alpha_1^0, \alpha_2^0, \ldots, \alpha_M^0]^T$;

(E2) setting $f(\alpha^0) = f^0$, for $f = [f_1, f_2, \ldots, f_M]^T$;

(E3) using a Gauss elimination to compute $d\alpha$, such that $$\left[\frac{\partial f}{\partial \alpha}\right]^0 d\alpha = -f^0;$$

(E4) updating $\alpha$ such that $\alpha^1 = \alpha^0 + \lambda d\alpha$, where $\alpha^1$ indicates an updated $\alpha$ and $\lambda$ indicates a weight, for $0 \leq \lambda \leq 1$; and (E5) repeating steps (E1) to (E4) until a convergence occurs.

12. The method as claimed in claim 11, wherein the weight in step (E4) ranges from zero to one.

\* \* \* \* \*